J. A. PITTMAN & S. A. JAMES.
PIPE JOINING MACHINE.
APPLICATION FILED SEPT. 28, 1908.
924,828.
Patented June 15, 1909.
2 SHEETS—SHEET 1.
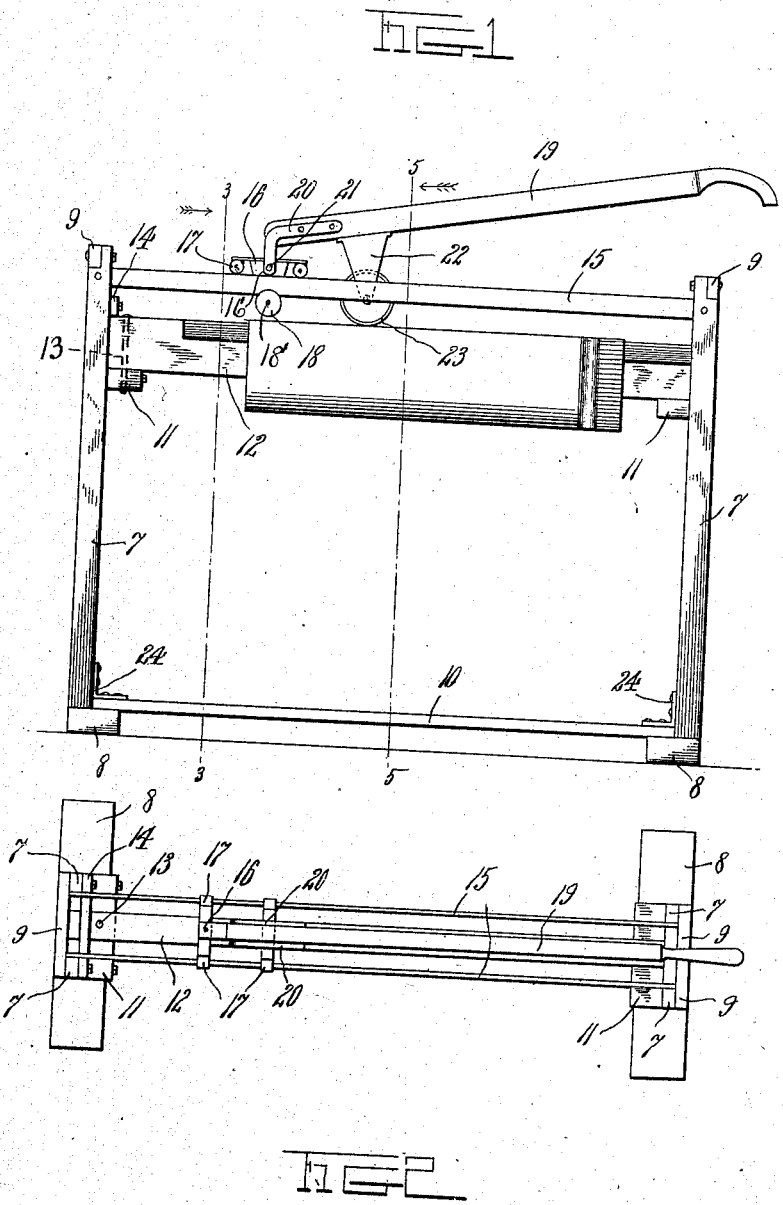
Witnesses
Inventors
John A. Pittman,
Samuel A. James,
By
Attorneys

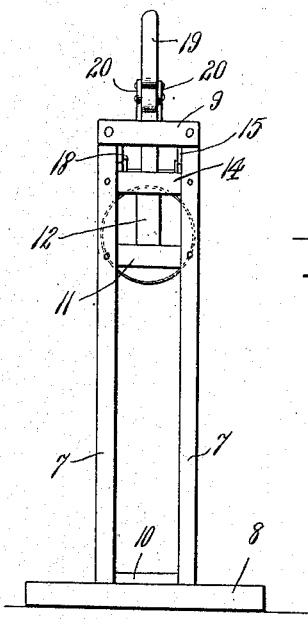
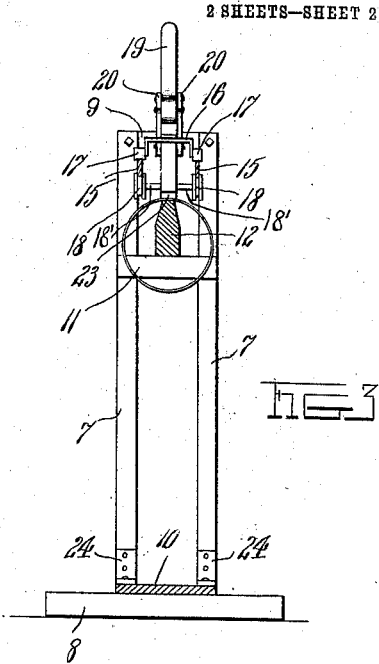
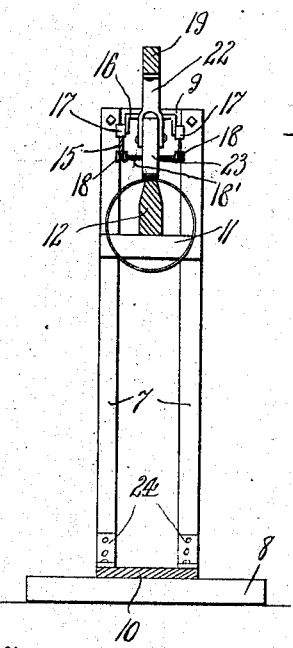
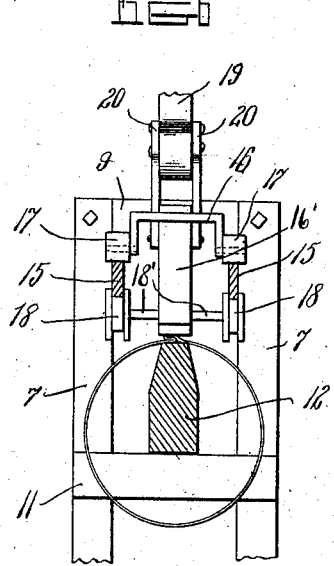

UNITED STATES PATENT OFFICE.

JOHN A. PITTMAN AND SAMUEL A. JAMES, OF SPIRO, OKLAHOMA.

PIPE-JOINING MACHINE.

No. 924,828.      Specification of Letters Patent.      Patented June 15, 1909.

Application filed September 28, 1908. Serial No. 454,973.

*To all whom it may concern:*

Be it known that we, JOHN A. PITTMAN and SAMUEL A. JAMES, citizens of the United States, residing at Spiro, in the county of Le Flore, State of Oklahoma, have invented certain new and useful Improvements in Pipe-Joining Machines; and we do hereby declare the following to be a full, clear, and exact description of the invention, such as will enable others skilled in the art to which it appertains to make and use the same.

The invention relates to a pipe joining machine and more particularly to the class of machines for joining and securing the lock seam of sheet metal stove pipes.

The primary object of the invention is the provision of a pipe joining machine comprising a frame having a work support, a movable carriage above said work support, a manually operable lever pivotally connected to the carriage and having a depending pressure roller to engage the work and by means of which the longitudinal joint of a stove pipe or the like can be accurately and speedily formed, so as to produce a joint of secure character, smooth and leaving no open space in the joint for sparks to pass through and which will prevent leakage without the use of solder or other securing means or material.

A further object of the invention is the provision of a machine for joining the longitudinal seams of pipes, particularly sheet metal stove pipes, and comprises a pressure roller brought into action by a leverage bar, the said roller operative upon the latch joint of a stove pipe supported upon a work support, so that the joint will be made secure to prevent leakage through the same, the said work support adapted to receive stove pipes of varying diameters.

With these and other objects in view the invention for example consists in the construction, combination and arrangement of parts as will be hereinafter more fully described and as illustrated in the accompanying drawings which disclose the preferred form of embodiment of the invention. However, changes, variations and modifications may be made such as come properly within the scope of the claims hereunto appended without departing from the spirit of the invention.

In the drawings: Figure 1 is a side elevation of the invention. Fig. 2 is a top plan view thereof. Fig. 3 is a vertical sectional view on the line 3—3 of Fig. 1 with a stove pipe in position on the work support. Fig. 4 is a front end elevation of the machine. Fig. 5 is a vertical sectional view on the line 5—5 of Fig. 1 to show the mounting of the traveling carriage. Fig. 6 is a fragmentary vertical sectional view.

Similar reference characters indicate corresponding parts throughout the several views in the drawings.

In the drawings, the machine comprises a main supporting frame including spaced vertical uprights 7 which are joined at their lower ends to horizontally disposed foot or base pieces 8 and connected at their upper ends by cross pieces 9, the said base pieces being united by a centrally located longitudinal beam 10. A distance below the upper ends of the uprights 7 and secured thereto are transverse bearing blocks 11 the same forming a mounting for a horizontally disposed work support or beam 12 arranged centrally of the main frame and extending longitudinally of the same. The work support 12 is connected by a pivot bolt 13 to the front or forward bearing block 11 to permit the opposite end of the said bearing block to swing laterally to opposite sides of the main frame from its normal resting position upon the other bearing block 11 at the rear of the main frame so that a stove pipe or the like can be positioned on the work support.

Directly above the pivoted end of the work support 12 and bolted to the uprights 7 at the front of the main frame is a horizontally disposed brace piece or bar 14 the same serving to steady the work support and to guide it in its lateral movement. Extending longitudinally of the main frame are spaced horizontally disposed bars forming tracks 15 the same arranged in parallelism with each other and connected to the upper ends of the uprights 7 in superposed relation with respect to the work support 12.

Mounted between the tracks 15 is a movable carriage 16 having journaled thereon frictional rollers 17 the same arranged at opposite sides of said carriage and adapted to travel upon the upper faces of the said tracks 15. Connected to the carriage 16 below the tracks 15 are grooved rotatable rollers 18 the same having their grooves engaging the lower edges of the tracks 15 to guide the said carriage longitudinally upon the tracks.

Connected to the movable carriage 16 is a hand operable pressure lever 19 to the inner end of which and at opposite sides thereof are fixed angle irons 20 which latter are connected to the movable carriage by a pivot bolt 21 so as to permit swinging movement of the pressure lever. Depending and secured to the pressure lever 19 in close proximity to its inner pivoted end is a bracket or casting 22 in which is rotatably mounted a pressure roller 23 the same being in alinement with the longitudinal extent of the work support to engage and press together the lapped edges of a stove pipe when positioned upon the work support and thereby securely lock the lapped edges of a stove pipe to form its longitudinal seam. It is obvious the grooved rollers 18 are rotatably mounted upon fixed stud journals 18' extending from opposite sides of the depending portion 16' of the carriage.

In operation, a stove pipe is mounted upon the work support 12 by encircling the same so as to have its overlapped edges resting longitudinally upon the said work support to be acted upon by the pressure roller in such a manner as to form an interlocking joint with each other. The operator grips the pressure lever 19 and presses downwardly on the same to bring the pressure roller 23 in position onto the seam and by pulling rearwardly on the pressure lever the carriage 16 is caused to travel upon the tracks 15 during which movement the said pressure roller 23 moves upon and compresses the lapped edges of a stove pipe to form an interlocking seam longitudinally of the same so that all liability of the said seam separating or pulling apart is obviated. It is obvious that due to the pivotal connection of the pressure lever 19 with the movable carriage 16 a varying compression effect can be imparted to the pressure roller 23 when acting upon work supported by the work support and this is accomplished by increasing the downward pressure upon the pressure lever or by decreasing the downward pressure on the same.

Secured to the uprights 7 and to the center beam 10 are angle brace bars 24, the latter adapted to maintain the frame more rigid at its base.

What is claimed is—

1. A machine of the class described comprising a main frame, a work support carried by the main frame, tracks disposed above said work support and fixed to the main frame, a movable carriage having frictional wheels engaging the upper and lower edges of the tracks, a pressure lever pivotally connected to the carriage and rotatable pressure means carried by the lever.

2. A machine of the class described comprising a main frame, a work support pivotally mounted in said main frame and adapted to move laterally to opposite sides of the main frame, spaced tracks connected to the main frame and arranged above the work support, a carriage movable between the said tracks, friction rollers carried by said carriage and engaging the upper and lower edges of the tracks, a pressure lever pivotally connected to the carriage and a pressure roller carried by said lever.

3. A machine of the class described comprising a main frame, a work support pivotally mounted in said main frame and adapted to move laterally to opposite sides of the main frame, spaced tracks connected to the main frame and arranged above the work support, a carriage movable between the said tracks, friction rollers carried by said carriage and engaging the upper and lower edges of the tracks, leverage means having connection with the carriage, and a pressure roller supported by said means.

4. A machine of the class described comprising a main frame, a laterally shiftable work support mounted horizontally in the main frame, spaced parallel tracks carried by the main frame and in superposed relation to the work support, friction rollers engaging the upper and lower edges of the tracks, a carriage movably supported by the friction rollers, a pressure lever pivotally connected to the carriage, a bracket fixed to said lever in proximity to its pivotal connection with the carriage, and a pressure roller rotatably mounted in the bracket and adapted to act upon work mounted upon the work support.

In testimony whereof, we affix our signatures, in presence of two witnesses.

JOHN A. PITTMAN.
SAMUEL A. JAMES.

Witnesses:
J. R. REDWINE,
W. L. BROWN.